United States Patent [19]

Murao et al.

[11] Patent Number: 4,783,270

[45] Date of Patent: Nov. 8, 1988

[54] COAGULANT FOR MINUTE MINERAL PARTICLES IN SUSPENSION AND METHOD FOR COAGULATING THEREOF

[75] Inventors: Yoshikazu Murao, Machida; Shigeru Sawayama, Yokohama; Kenji Mori, Komae, all of Japan

[73] Assignee: Mitsubishi Chemical Industries Limited, Tokyo, Japan

[21] Appl. No.: 115,160

[22] Filed: Oct. 30, 1987

Related U.S. Application Data

[63] Continuation of Ser. No. 833,131, Feb. 24, 1986, abandoned.

[30] Foreign Application Priority Data

Feb. 27, 1985 [JP] Japan .................................. 60-38593

[51] Int. Cl.$^4$ ............................ C09K 3/00; C02F 1/56
[52] U.S. Cl. ...................................... 210/734; 252/60; 252/358; 210/907
[58] Field of Search ................ 210/734, 728; 252/60, 252/358; 526/287; 209/5

[56] References Cited

U.S. PATENT DOCUMENTS

| | | | |
|---|---|---|---|
| 3,607,622 | 9/1971 | Espy | 162/167 |
| 3,859,212 | 1/1975 | Smalley et al. | 210/54 |
| 4,471,097 | 9/1984 | Uhl et al. | 526/287 X |
| 4,526,947 | 7/1985 | Castner | 526/287 |
| 4,536,294 | 8/1985 | Guillet et al. | 210/730 |
| 4,547,463 | 10/1985 | Sakata et al. | 526/287 X |
| 4,555,558 | 11/1985 | Giddings et al. | 526/287 |
| 4,587,108 | 5/1986 | MacDonald | 423/11 |
| 4,590,249 | 5/1986 | Cabestary et al. | 526/287 |
| 4,599,390 | 7/1986 | Fan et al. | 526/240 |
| 4,631,317 | 12/1986 | König et al. | 526/287 X |

Primary Examiner—Matthew A. Thexton
Assistant Examiner—Catherine S. Kilby
Attorney, Agent, or Firm—John P. White

[57] ABSTRACT

Disclosed herein are a coagulant for minute mineral particles in suspension, comprising a copolymer of 0.5 to 10 mol % of 2-acrylamido-2-methylpropanesulfonic acid or a salt thereof, 40 to 99.5 mol % of N-hydroxymethylacrylamide and 0 to 59.5 mol % of acrylamide and showing a reduced viscosity of 10 to 30 dl/g in an aqueous 1N solution of sodium chloride at a temperature of 25° C. and a concentration of the copolymer of 0.1 g/dl therein, and a method for coagulating the minute mineral particles in a suspension, comprising adding the coagulant a neutral waste water.

5 Claims, 4 Drawing Sheets

Fig. 1

Content of AMPS Units in the Copolymer

Content of N-hydroxymetylacrylamide
Units in the Copolymer

COAGULANT FOR MINUTE MINERAL PARTICLES IN SUSPENSION AND METHOD FOR COAGULATING THEREOF

This application is a continuation of U.S. Ser. No. 833,131, filed Feb. 24, 1986, now abandoned, the contents of which are hereby incorporated by reference into the present application.

FIELD OF THE INVENTION

The present invention relates to a coagulant suitable for treating waste water which contains minute mineral particles in a suspended state therein, and a method for coagulating the minute mineral particles contained in waste water in a suspended state therein.

More in detail, the present invention relates to (1) a coagulant for the minute mineral particles in suspension, comprising a copolymer of 0.5 to 10 mol % of 2-acrylamido-2-methylpropanesulfonic acid or a salt thereof, 40 to 99.5 mol % of N-hydroxymethylacrylamide and 0 to 59.5 mol % of acrylamide and showing a reduced viscosity of 10 to 30 dl/g in an aqueous 1N solution of sodium chloride at a temperature of 25° C. and a concentration of the copolymer of 0.1 g/dl therein and (2) a method for coagulating minute mineral particles, which method comprises adding a coagulatnt to neutral waste water containing the minute mineral particles in a suspended state therein, the coagulant comprising a copolymer of 0.5 to 10 L mol % of 2-acrylamido-2-methylpropanesulfonic acid or a salt thereof, 40 to 99.5 mol % of N-hydroxymethylacrylamide and 0 to 59.5 mol % of acrylamide and showing a reduced viscosity of from 10 to 30 dl/g in an aqueous 1N solution of sodium chloride at a temperature of 25° C. and a concentration of the copolymer of 0.1 g/dl therein.

As a coagulant used for removing from waste water minute solid particles suspending in the waste water, an anionic coagulant comprising a partially hydrolyzed polyacrylamide or a copolymer of acrylamide and acrylic acid has been broadly used in various fields. On the other hand, as another coagulants which are different from the hitherto-used coagulants of acrylamide/acrylic acids and exhibit favorable results over a broad range of pH of the waste water, such as those anionic coagulants containing sulfonate group(s) have come to be gradually used in specified fields.

Since the waste water containing minute mineral particles, particularly the muddy water being discharged in the treatment of ore, is a waste water which is extremely difficultly subjected to the treatment of precipitating the particles contained therein and condensing thereof, and the conventional partially hydrolyzed polyacrylamide or the conventional copolymer of acrylamide and acrylic acid do not give a sufficient result of treatment, various specific coagulants have been proposed for that purpose.

For example, a copolymer comprising 40 to 99 mol % of acrylamide, 1 to 35 mol % of 2-acrylamido-2-methyl-propanesulfonic acid (hereinafter referred to as AMPS) and 0 to 25 mol % of acrylic acid is disclosed in U.S. Pat No. 4,342,653, and in European Pat Nos. 74,660-74,662, it is disclosed that a copolymer of a hydrophilic monomer such as acrylamide and a hydrophobic monomer is suitable for that purpose. Furthermore, Japanese Patent Applications Laid-Open (KOKAI) No. 59-17013 (1984) and No. 59-196309 (1984) disclose a copolymer comprising a monomer containing sulfonate group(s), N-substituted or not-substituted acrylamide or methacrylamide, a hydrophobic monomer and an unsaturated carboxylic acid monomer, and Japanese Patent Application Laid-Open (KOKAI) No. 59-156499 (1984) also discloses the use of calcium sulfate in addition to the above-mentioned high polymeric coagulants for solidifying the waste water from phosphorous ore treating.

However, in any of the above-mentioned methods, (1) a special monomer is used in a large aount for obtaining its effect as is seen, for instance, in the case of using the coagulant disclosed in U.S. Pat No. 4,342,653 L wherein although the coagulant is effective in treating the above-mentioned waste water, it is necessary for that purpose that the coagulant contains the expensive monomer, AMPS, more than about 15 mol % therein and (2) it is difficult to obtain the copolymer of a high molecular weight. These facts result in the high cost of producing the copolymer and in the disadvantage of increasing the cost of treating the waste water.

The object of the present invention is to solve the above-mentioned technical problem and to treat the waste water containing minute mineral particles, particularly the waste water from the mineral ore treating, advantageously in an industrial scale.

The above-mentioned object of the present invention is attained by adding, to the neutral waste water containing the minute mineral particles in a suspended state, a coagulant comprising a copolymer of 0.5 to 10 mol % of AMPS or a salt thereof, 40 to 99.5 mol % of N-hydroxymethylacrylamide and 0 to 59.5 mol % of acrylamide and showing a reduced viscosity of from 10 to 30 dl/g in an aqueous 1N solution of sodium chloride at a temperature of 25° C. and a concentration of the copolymer of 0.1 g/dl therein.

SUMMARY OF THE INVENTION

In a first aspect of the present invention, there is provided a coagulant for minute mineral particles in suspension, comprising a copolymer of 0.5 to 10 mol % of AMPS or a salt thereof, 40 to 99.5 mol % of N-hydroxymethylacrylamide and 0 to 59.5 mol % of acrylamide and showing a reduced viscosity of 10 to 30 dl/g in an aqueous 1N solution of sodium chloride at a temperature of 25° C. and a concentration of 0.1 g/dl therein.

In a second aspect of the present invention, there is provided a method for coagulating minute mineral particles in suspension, which comprises adding a coagulant into a neutral waste water containing the minute mineral particles in suspension therein, said coagulant comprising a copolymer of 0.5 to 10 mol % of 2-acrylamido-2-methylpropanesulfonic acid or a salt thereof, 40 to 99.5 mol % of N-hydroxymethylacrylamide and 0 to 59.5 mol % of acrylamide and showing a reduced viscosity of 10 to 30 dl/g in an aqueous 1N solution of sodium chloride at a temperature of 25° C. and a concentration of the copolymer of 0.1 g/dl therein.

BRIEF DESCRIPTION OF THE DRAWINGS

Of the attached drawings.

DETAILED DESCRIPTION OF THE INVENTION

The waste water containing minute mineral particles in the present invention, particularly, the waste water in the course of treating the mineral ore is the waste water after clashing, sifting, classifying, floataton, etc. of the mined raw phosphorous ore, and, the waste water is almost neutral, namely, the pH of such a waste water is in general around 7. As a waste water mentioned above, the wasste water from phosphorous ore treating, the tailing waste water from copper ore treating and the waste water from aggregates washing may be exemplified. These waste waters usually contain solid matter in an extent of 1 to 10% by weight. The suspended solid matter contained in such a waste water is hardly sedimented, and it is extremely important for the preservation of environment and the improvement of economic efficiency of the production of concentrate to rapidly sediment the solid matter by using thickeners, thereby reducing the amount of the muddy solid matter to be discharged and in the same time, reusing the supernatant water obtained by sedimentation of the solid matter in a pretreatment step.

The copolymer composition exhibiting the performances as the object of the present invention comprises 0.5 to 10 mol % of AMPS or a salt thereof, 40 to 99.5 mol % of N-hydroxymethylacrylamide and 0 to 59.5 mol % of acrylamide, preferably comprises 0.5 to 10 mol % of AMPS or a salt thereof, 45 to 99.5 mol % of N-hydroxymethylacrylamide and 0 to 54.5 mol % of acrylamide. Even if the content of AMPS is over 10 mol %, the improvement of the sedimentation rate of the solid matter is not observed and accordingly, such a large amount of AMPS only gives a negative result of impairing the economic efficiency.

In addition, it is possible to obtain and use the pluralistic copolymer by adding inert and copolymerizable component(s) to the ternary monomeric system consisting of AMPS, N-hydroxymethylacrylamide and acrylamide.

It is desirable that the coagulant according to the present invention shows a reduced viscosity of 10 to 30 dl/g measured in an aqueous 1N solution of sodium chloride at a concentration of 0.1 g/dl and at a temperature of 25° C.

The coagulant (anionic coagulant) according to the present invention can be produced by subjecting AMPS or a salt thereof, N-hydroxymethylacrylamide and acrylamide to known copolymerization in an aqueous solution or known water-in-oil suspension polymerization in the presence of a radical initiator. Since the thus formed copolymer is apt to be cross-linked and insolubilized by drying, it is reasonable to dilute the thus formed solution or suspension of copolymer without separating the copolymer and thereafter to use the thus diluted copolymer in treating the waste water.

The coagulant according to the present invention can be also produced by a more economically advantageous method of N-hydroxymethylation of a copolymer of AMPS and acrylamide by inexpensive formaldehyde or paraformaldehyde. In such a case, into an aqueous solution of the copolymer of AMPS and acrylamide of a low concentration of 1 to 3% by weight, a basic substance is added as a catalyst, thereby adjusting the pH of the aqueous solution to not lower than 10 and then formaldehyde or paraformaldehyde is added to the mixture. The above-mentioned N-hydroxymethylation proceeds quite rapidly and accordingly, the reaction is carried out easily in the actual field of treating the waste water by admixing an N-hydroxymethylation agent with an aqueous solution of the copolymer of AMPS and acrylamide.

On the other hand, a copolymer comprising 2 to 40 mol % of AMPS and 60 to 98 mol % of N-hydroxymethylacrylamide and acrylamide has been known by U.S. Pat. No. 3,975,496 to be suitable for treating a strongly alkaline red mud generating in the production of alumina from bauxite.

However, it is an unexpected fact that the coagulant according to the present invention comprising a specified copolymer containing the AMPS units in an amount of as low as 10 mol % exhibits an extremely remarkable effects also to the waste water around neutrality.

As a catalyst for N-hydroxymethylation, those which can adjust the pH of the reaction system to not lower than 10 can be used without any restriction, however, the agent which can adjust the pH of the reaction system to not ower than 10 by use of 5 to 10 mol % thereof to the constituting acrylamide units, such as sodium hydroxide, potassium hydroxide, sodium carbonate, potassium carbonate, sodium phosphate, potassium phosphate and triethylamine is particularly suitable.

The amount of formaldehyde or paraformaldehyde necessary for the above-mentioned reaction (N-hydroxymethylation) is selected in the range of 75 to 100 mol % as formaldehyde to the amount of acrylamide units in the copolymer of AMPS and acrylamide. In the case of using an excess amount of formaldehyde, although the reaction rate of N-hydroxymethylation is higher than in the above-mentioned case, it is not favorable because the large amount of unreacted formaldehyde remain in the product.

The mixing of an aqueous solution of the copolymer of AMPS and acrylamide with formaldehyde or paraformaldehyde is carried out by a known operation such as mixing in a vessel equipped with a stirrer, impregnation in a gel state or mixing in a tube.

The above-mentioned N-hydroxymethylation proceeds extremely rapidly, and under the condition of a room temperature of 25° to 30° C., the reaction attains to 90% of the conversion at equilibrium within 3 to 5 hours, and after a long time for the reaction, it reaches to the conversion at equilibrium. The N-hydroxymethylation is accelerated by raising the reaction temperature, however, the hydrolysis of acrylamide by the alkali added as a catalyst is also accelerated thereby.

In a case where the content of the thus formed acrylic salt units of the copolymer is larger than 10 mol % of the content of the acrylamide units before subjecting the copolymer to the N-hydroxymethylation, the performance of the product of compressing the sedimented particles is reduced and accordingly, it is necessary to stop the N-hydroxymethylation, thereby keeping the content of the acrylic salt units not more than 10 mol %, preferably not more than 5 mol %. For that purpose, it is preferable to use the basic catalyst for the N-hydroxymethylation in an amount of not more than 10 mol % of the content of acrylamide unit in the copolymer before subjecting the copolymer to the N-hydroxymethylation and, in addition, to effect the reaction at a temperature of lower than about 70° C.

The preferred method of coagulating the suspended minute mineral particles according to the present invention is a method using a thickener. In such a case, the aqueous solution of the coagulant is obtained by dissolving the copolymer into water at a concentration of 0.1 to 0.3% by weight and is supplied into the feed well of the thickener directly or after further dilution. The preferred amount of addition of the coagulant is 5 to 500 g/ton of the minute mineral particles in the waste water. Although the addition of the coagulant may be carried out at one-point, it is preferable to carry out at multiple-points for better mixing of the coagulant with the waste water.

In addition, it may be possible to mix the waste water with the aqueous solution of the coagulant in a mixing vessel in advance of supplying the waste water to the thickener.

According to the present invention, a coagulant which can advantageously treat, in an industrial scale, the waste water containing minute mineral particles in a suspended state is provided, and the coagulant according to the present invention is favorably suitable for treating the waste water from the phosphorous ore which has been difficult hitherto.

The present invention will be explained more in detail while referring to the non-limitative examples as follows.

EXAMPLE 1

Into a three-necked 50 ml-flask equipped with a stirrer, an aqueous solution consisting of 41.5 g of deionized water and 0.27 g of $Na_3PO_4.12H_2O$ was introduced, and under stirring, 1.0 g of a powdery copolymer consisting of 1.0 mol % of AMPS and 99.0 mol % of acrylamide was added to the solution in the flask, and after dissolving uniformly, an aqueous 5% by weight solution of formaldehyde, which solution contains an equimolar amount of formaldehyde to the amount of acrylamide units in the copolymer was admixed with the mixture in the flask, and the N-hydroxymethylation of the copolymer was carried out while stirring and heating the mixture in the flask to 50° C. for 3 hours. The thus obtained N-hydroxymethylated copolymer was dissolved in an aqueous 1N solution of sodium chloride at a concentration of 0.1 g/dl. The reduced viscosity ($\eta sp/C$) was obtained according to the following formula, wherein C(g/dl) is a concentration of N-hydroxymethylated copolymer in aqueous 1N solution of sodium chloride and $t_0$ (60.2 sec) and t are flowing times (sec.) of aqueous 1N solution of sodium chloride and the N-hydroxymethylated copolymer solution, respectively, measured with Ostwald's viscometer at a temperature of 25° C.:

$$\eta sp/C = \left(\frac{t - t_0}{t_0}\right)/C$$

and is shown in Table 3.

In the next place, after adding 5 parts of deionized water to 1 part of a waste water from the Florida phosphorous ore treating, the thus diluted waste water was introduced into a 100 ml-graduated colorimetric tube, and an aqueous 0.01% by weight solution of the thus prepared N-hydroxymethylated copolymer was added thereto. After mixing the two aqueous liquids by turning the tube upside down 10 times, the tube was kept for standing vertically to see the sedimentation velocity of the interface between dispersing layer and clarifying layer and the sedimentation volume after keeping the tube for one hour, thereby carrying out the test for evaluating the performance of the coagulant on the sedimentation and compressability of the solid particles. The results of the test are shown in Table 3.

EXAMPLES 2 TO 8

In the same manner as in Example 1 except for adding 1.0 g of each of the powdery copolymers shown below instead of adding 1.0 g of the copolymer consisting of 1.0 mol % of AMPS and 99.0 mol % of acrylamide, each of the N-hydroxymethylated copolymers according to the present invention was obtained.

TABLE 1

| Copolymers used in Examples 2 to 8 | | |
|---|---|---|
| | Constitution unit (mol %) | |
| Examples | AMPS | Acrylamide |
| 2 | 2.0 | 98.0 |
| 3 | 3.0 | 97.0 |
| 4 | 5.0 | 95.0 |
| 5 | 10.0 | 90.0 |
| 6 | 4.0 | 96.0 |
| 7 | 4.0 | 96.0 |
| 8 | 4.0 | 96.0 |

The constitutional composition and the reduced viscosity of each of the N-hydroxymethylated copolymers thus obtained, and the results of evaluation of the performances of the N-hydroxymethylated copolymers as the coagulant on the sedimentation and compressability of the solid particles are also shown in Table 3.

COMPARATIVE EXAMPLES 1 TO 20

Of Comparative Examples 1 to 20, in Comparative Examples 1 to 4, 14 to 18, the copolymer and homopolymer shown below were N-hydroxymethylated in the same manner as in Example 1 and the results of the performances of the thus obtained N-hydroxymethylated copolymers and homopolymer as the coagulant are shown also in Table 3. In Comparative Examples 5 to 13, 19 and 20, the copolymers and homopolymer shown below were not subjected to N-hydroxymethylation and their performances as the coagulant are also shown in Table 3.

TABLE 2

| Copolymers used in Comparative Examples 1 to 20 | | | |
|---|---|---|---|
| Comparative | Constitution unit (mol %) | | |
| Example Nos. | AMPS | Acrylamide | Acrylic acid |
| 1 | 0.0 | 100.0 | 0.0 |

TABLE 2-continued

Copolymers used in Comparative Examples 1 to 20

| Comparative Example Nos. | Constitution unit (mol %) | | |
|---|---|---|---|
| | AMPS | Acrylamide | Acrylic acid |
| 2 | 15.0 | 85.0 | 0.0 |
| 3 | 20.0 | 80.0 | 0.0 |
| 4 | 25.0 | 75.0 | 0.0 |
| 5 | 0.0 | 100.0 | 0.0 |
| 6 | 5.0 | 95.0 | 0.0 |
| 7 | 10.0 | 90.0 | 0.0 |
| 8 | 15.0 | 85.0 | 0.0 |
| 9 | 20.0 | 80.0 | 0.0 |
| 10 | 0.0 | 95.0 | 5.0 |
| 11 | 0.0 | 90.0 | 10.0 |
| 12 | 0.0 | 80.0 | 20.0 |
| 13 | 0.0 | 70.0 | 30.0 |
| 14 | 0.0 | 95.0 | 5.0 |
| 15 | 0.0 | 90.0 | 10.0 |
| 16 | 0.0 | 80.0 | 20.0 |
| 17 | 0.0 | 70.0 | 30.0 |
| 18 | 4.0 | 96.0 | 0.0 |
| 19 | 4.0 | 96.0 | 0.0 |
| 20 | 0.0 | 90.0 | 10.0 |

TABLE 4

Constitution Units

| A | B | C | D |
|---|---|---|---|
| —CH$_2$CH— \| CO \| NH$_2$ | —CH$_2$CH— \| CO \| NH \| CH$_3$—C—CH$_3$ \| CH$_2$ \| SO$_3$Na | —CH$_2$CH— \| CO \| NH \| CH$_2$ \| OH | —CH$_2$CH— \| CO \| ONa |

A: Acrylamide Unit
B: AMPS Unit (sodium salt)
C: N—hydroxymethylacrylamide Unit
D: Acrylic acid Unit (sodium salt).

Figure 1:
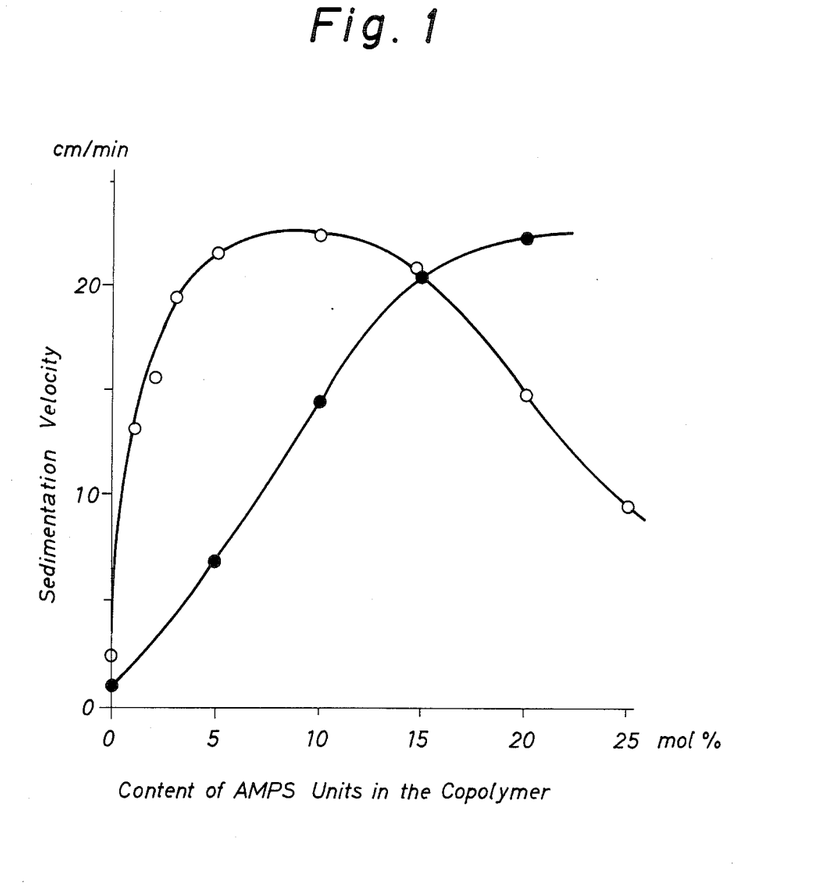
FIG. 1 shows the relationship between the content of the AMPS units in the copolymer and the sedimentation velocity of the minute particles in the cases where (1) an aqueous solution of a copolymer of acrylamide and AMPS (shown by — · — ) and (2) an aqueous solution of a modified copolymer of a copolymer of acrylamide and AMPS by N-hydroxymethylation (shown by —◉—) are respectively added to the waste water from the Florida phosphorous ore treating.
Figure 2:
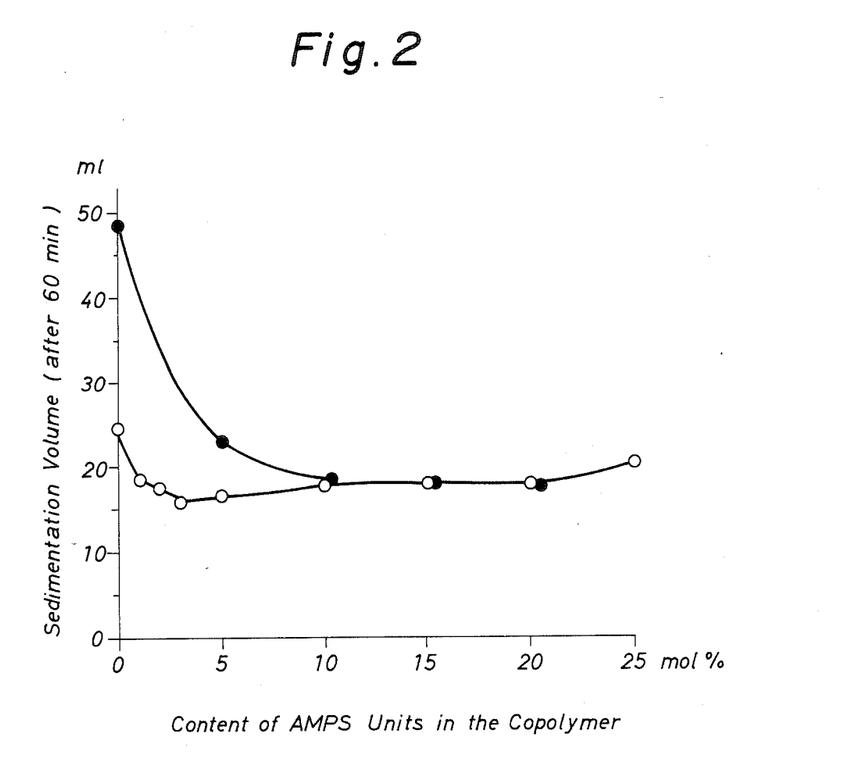
FIG. 2 shows the relationship between the content of the AMPS units in the copolymer and the sedimentaton volume under the same conditions as above.
Figure 3:
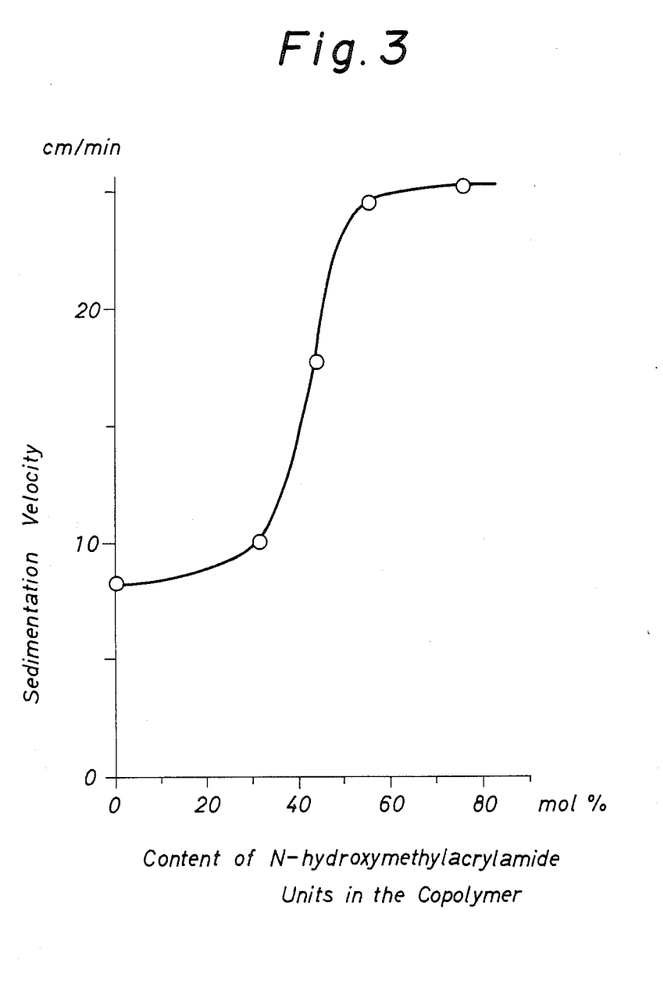
FIG. 3 shows the relationship between the content of N-hydroxymethylacrylamide units in the copolymer and the sedimentation velocity of the minute particles suspended in the same waste water from the Florida phosphorous ore treating as above in the case where an aqueous solution of a modified polyacrylamide by N-hydroxymethylation containing 4 mol % of AMPS units is added to the same waste water from the Florida phosphorous ore treating and FIG. 4 shows the relationship between the content of N-hydroxymethylacrylamide units in the copolymer and the sedimentation volume under the same conditions as above.
Figure 4:
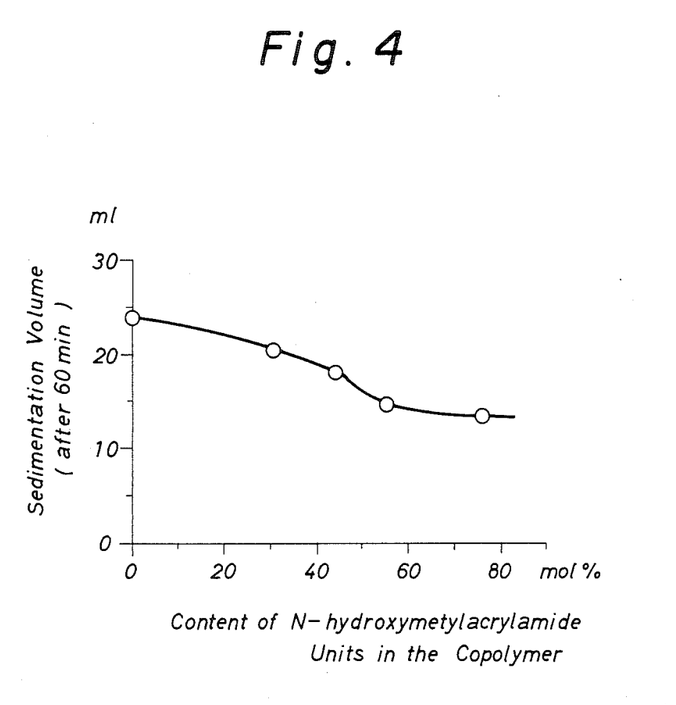

FIGS. 1 to 4 are the graphical representation of the sedimentation velocity and the sedimentation volume shown in Table 3.

EXAMPLE 9

In a 50 ml test tube 3.78 g of acrylamide, 6.40 g of N-hydroxymethylacrylamide, 9.28 g of an aqueous 25% by weight solution of sodium 2-acrylamido-2-methyl-propanesulfonate and 26.79 g of deionized water were introduced, and the content of the test tube ws uniformly mixed to obtain a solution.

After introducing 3.75 g of an aqueous 0.2% by weight solution of dihydrochloride of 2,2'-azobis-2-amidinopropane into the solution, the test tube was equipped with a three-way stopper having an inlet tube for introducing gaseous nitrogen and an outlet tube connected with a vacuum syste and the atmosphere in the test tube was replaced with gaseous nitrogen. Poly-

TABLE 3

Constitution Units and Performance of the Coagulants

| Example or Comparative Example | Constitution Unit (mol %) | | | | Reduced Viscosity, $\eta sp/c$ (dl/g) | Sedimentation velocity (cm/min) | Sedimentation volume of settled, solids ml (after 60 min.) |
|---|---|---|---|---|---|---|---|
| | acrylamide unit | AMPS unit | N—hydroxy-methylacryl-amide unit | acrylic acid Unit | | | |
| Example | | | | | | | |
| 1 | 27.4 | 1.0 | 71.6 | 0 | 24.4 | 13.1 | 18.5 |
| 2 | 27.1 | 2.0 | 70.9 | 0 | 21.1 | 16.5 | 17.5 |
| 3 | 28.9 | 3.0 | 68.1 | 0 | 21.7 | 19.5 | 16.0 |
| 4 | 27.3 | 5.0 | 67.7 | 0 | 21.9 | 21.4 | 16.5 |
| 5 | 22.0 | 10.0 | 68.0 | 0 | 24.3 | 22.5 | 17.5 |
| 6 | 20.3 | 4.0 | 75.7 | 0 | 22.0 | 25.2 | 13.5 |
| 7 | 40.4 | 4.0 | 55.6 | 0 | 24.1 | 24.6 | 14.5 |
| 8 | 52.2 | 4.0 | 43.8 | 0 | 23.2 | 17.7 | 18.0 |
| Comparative Example | | | | | | | |
| 1 | 28.4 | 0 | 71.6 | 0 | 24.5 | 4.4 | 24.5 |
| 2 | 20.9 | 15.0 | 64.1 | 0 | 21.0 | 20.8 | 18.0 |
| 3 | 15.2 | 20.0 | 64.8 | 0 | 20.7 | 14.9 | 18.0 |
| 4 | 9.1 | 25.0 | 65.9 | 0 | 16.3 | 9.5 | 20.5 |
| 5 | 100 | 0 | 0 | 0 | 27.1 | ≦1.0 | 48.5 |
| 6 | 95 | 5 | 0 | 0 | 27.7 | 6.9 | 23.0 |
| 7 | 90 | 10 | 0 | 0 | 25.7 | 14.5 | 18.5 |
| 8 | 85 | 15 | 0 | 0 | 24.2 | 20.6 | 17.5 |
| 9 | 80 | 20 | 0 | 0 | 24.5 | 22.3 | 17.5 |
| 10 | 95 | 0 | 0 | 5 | 25.7 | 5.6 | 41.0 |
| 11 | 90 | 0 | 0 | 10 | 30.0 | 3.1 | 28.0 |
| 12 | 80 | 0 | 0 | 20 | 31.6 | 2.6 | 29.5 |
| 13 | 70 | 0 | 0 | 30 | 27.1 | 1.6 | 33.0 |
| 14 | 42.3 | 0 | 52.7 | 5 | 21.9 | 15.6 | 22.0 |
| 15 | 32.7 | 0 | 57.3 | 10 | 25.9 | 10.9 | 26.5 |
| 16 | 25.4 | 0 | 54.6 | 20 | 28.8 | 3.1 | 28.0 |
| 17 | 17.0 | 0 | 53.0 | 30 | 29.5 | 2.4 | 28.0 |
| 18 | 65.5 | 4.0 | 30.5 | 0 | 23.4 | 10.1 | 20.5 |
| 19 | 96.0 | 4.0 | 0 | 0 | 24.5 | 8.4 | 23.0 |
| 20 | 90 | 0 | 0 | 10 | 30.0 | 3.2 | 29.5 | merization of the reactant was carried out at a temperature of 50° C. for 4 hours.

In the same manner as in Example 1 the reduced viscosity and the performances of the thus obtained copolymer as a coagulant according to the present invention were evaluated, the results being shown in Table 5.

and the sedimented underflow of the bed was pumped out from the bottom of the vessel by using an underflow pump so as to maintain the height of the bed in the vessel at 15 cm. The underflow thus pumped out was dried for 3 hours at 120° C. to find the content of minute particles therein, and the results are shown in Table 7.

TABLE 6

| | Constitution Composition of Copolymer | | | | | |
|---|---|---|---|---|---|---|
| | Constitution Unit (mol %) | | | | | |
| Copolymer | acrylamide unit | AMPS unit | N—hydroxy-methylacryl-amide unit | acrylic acid unit | Reduced viscosity $\eta sp/c$, (dl/g) | Remarks |
| I | 43.6 | 4 | 52.4 | 0 | 25.4 | modified copolymer |
| II | 22.0 | 4 | 74.0 | 0 | 11.2 | terpolymer |
| III | 78.2 | 0 | 0 | 27.2 | 38.9 | partially hydrolyzed copolymer |

EXAMPLE 10

In the same manner as in Example 9, a copolymer shown in Table 5 was obtained. THe reduced viscosity and the performance thereof are shown also in Table 5.

COMPARATIVE EXAMPLES 21 TO 24

In a similar manner as in Example 9, one homopolymer and three copolymers shown in Table 5 were produced. The reduced viscosity and the performance of the homopolymer and the copolymers as a coagulant were determined as in Example 1 and the results are shown also in Table 5.

TABLE 7

| Content of Minute Particles in Underflow | | | | | |
|---|---|---|---|---|---|
| | | | | | Unit: % by weight |
| | Rate of addition of the copolymer (g/ton of solid matter) | | | | |
| Copolymer | 110 | 230 | 340 | 560 | 680 |
| Copolymer I | 7.2 | 12.4 | 14.6 | — | — |
| Copolymer II | — | 7.5 | 13.1 | — | — |
| Copolymer III | — | — | — | 6.8 | 8.8 |

EXAMPLE 12

Content of Minute Particles in Underflow

TABLE 5

| | Constitution Units and Performance of the Coagulants | | | | | | |
|---|---|---|---|---|---|---|---|
| | Constitution Unit (mol %) | | | | Reduced Viscosity, $\eta sp/c$ (dl/g) | Sedimentation velocity (cm/min) | Sedimentation volume of settled, solids ml (after 60 min.) |
| Example or Comparative Example | acrylamide unit | AMPS unit | N—hydroxy-methylacryl-amide unit | acrylic acid unit | | | |
| Example | | | | | | | |
| 9 | 42.0 | 8.0 | 50.0 | 0 | 18.6 | 15.7 | 16.0 |
| 10 | 0 | 8.0 | 92.0 | 0 | 14.2 | 16.5 | 14.5 |
| Comparative Example | | | | | | | |
| 21 | 0 | 0 | 100.0 | 0 | 16.7 | 3.7 | 23.0 |
| 22 | 72 | 8 | 20 | 0 | 20.8 | 10.6 | 19.0 |
| 23 | 92 | 8 | 0 | 0 | 18.4 | 8.8 | 20.5 |
| 24 | 90 | 0 | 0 | 10 | 30.0 | 3.4 | 28.5 |

EXAMPLE 11

Content of Minute Particles in Underflow

Evaluation of the three copolymers shown in Table 6 as a coagulant of the minute mineral particles in suspension was carried out by using a 3.5 inch-thickener (made by Enviro Clear Co.) as follows.

Into a 2inch-blending vessel equipped with a stirrer, a waste water from the Florida phosphorous ore treating, containing 3.29% by weight of the minute particles was supplied at a rate of 175 ml/min. Separately, an aqueous 0.1% by weight solution of each of the three copolymers was diluted by deionized water to be an aqueous 0.01% by weight solution of the copolymer, and the diluted copolymer solution was added into the vessel at a rate of addition shown in Table 7, and the mixture was stirred at 100 r.p.m. to form flocs of the mineral particles (mud). The thus formed flocs were continuously transferred to the thickener, thereby forming gradually a bed. The height of the bed was detected by a sensor In the same manner as in Example 11 except for using the waste water from the aggregates washing, containing 4% by weight of minute particles and adding copolymers I to III at a rate shown in Table 8, the evaluation of the same three copolymers in Example 11 was carried out. The results are shown in Table 8.

TABLE 8

| Content of Minute Particles in Underflow | | | | | |
|---|---|---|---|---|---|
| | | | | | Unit: % by weight |
| | Rate of addition of copolymer (g/ton of minute particles) | | | | |
| Copolymer | 25 | 50 | 75 | 100 | 125 |
| Copolymer I | 18.8 | 21.4 | 23.5 | — | — |
| Copolymer II | — | 19.8 | 21.1 | 21.8 | — |
| Copolymer III | — | — | 11.5 | 17.0 | 18.8 |

EXAMPLE 13

Relationship Between the Amount of Addition of the Copolymer and Minute Particle Content of Underflow The performance of the copolymers I and III was evaluated by using a 3 foot Pilot Unit Thickener (made by Enviro Clear Co.) in the treatment of the tailing waste water from floatation as follows.

After adjusting the pH of the copper tailing waste water from floatation to pH 7.5 by sulfuric acid, the thus adjusted waste water was supplied to the thickener at a rate of 1.3 m$^3$/hour, the content of minute particles in the waste water being 37% by weight.

Separately, 0.1% by weight solution of each of the copolymers in deionized water was line-diluted by process water to 0.01% by weight and the thus diluted copolymer solution was supplied to the inlet of the waste water of the thickener. The underflow was pumped out by an underflow pump from the bottom of the thickener so as to maintain the height of the bed of the sedimented particles at a predetermined level, and minute particles content of the thus pumped out underflow was measured by the specific gravity of the underflow, the relationship between the amount of addition of the copolymer and minute particle content of the underflow being shown in Table 9.

TABLE 9

Content of minute particle in underflow
Unit: % by weight

| Copolymer | Amount of addition of copolymer (g/ton of minute particles) | | | | |
|---|---|---|---|---|---|
|  | 12.5 | 15.0 | 17.5 | 20.0 | 22.5 |
| Copolymer I | 52.0 | 55.5 | 59.5 | 63.5 | 67.0 |
| Copolymer III | 50.5 | 53.0 | 56.0 | 58.5 | 61.5 |

What is claimed is:

1. A method of coagulation of the minute mineral particles in suspension, which comprises adding a coagulant comprising a copolymer of 0.5 to 10 mol % of 2-acrylamido-2-methylpropanesulfonic acid or a salt thereof, 40 to 99.5 mol % of N-hydroxymethylacrylamide and 20.3 to 59.5 mol % of acrylamide and showing a reduced viscosity of 10 to 30 dl/g in an aqueous 1N solution of sodium chloride at a temperature of 25° C. and a concentration of 0.1 g/dl therein, into a netural waste water containing the minute mineral particles in a suspended state therein.

2. A method according to claim 1, wherein said coagulant comprises a copolymer of 0.5 to 10 mol % of 2-acrylamido-2-methylpropanesulfonic acid or a salt thereof, 45 to 99.5 mol % of N-hydroxymethylacrylamide and 0 to 54.5 mol % of acrylamide.

3. A method according to claim 1, wherein said neutral waste water containing the minute mineral particles in a suspension is the waste water discharged when the mined mineral ore is treated.

4. A method according to claim 3, wherein said waste water is a waste water from phosphorous ore treating, a tailing waste water from copper ore treating and a waste water from aggregates washing.

5. A method according to claim 1 or 2, wherein the amount of addition of said coagulant is 5 to 500 g per ton of the minute mineral particles in said waste water.

* * * * *